Patented Dec. 2, 1941

2,264,766

UNITED STATES PATENT OFFICE 2,264,766

DETERGENT AND METHOD FOR PRODUCING THE SAME

Ernst Alfred Mauersberger, Maarssen, near Utrecht, Netherlands, assignor to Alframine Corporation, New York, N. Y., a corporation of New York No Drawing. Application March 1, 1938, Serial No. 193,267

4 Claims. (Cl. 252—152)

My invention relates to new compounds usable for detergent and like purposes, and to methods for producing such compounds.

The compounds of my invention are produced by reacting monoalkylolamines in less than stoichiometric quantities and in the presence of high temperatures on natural glycerides or glycerine esters of fatty acids, such as those present in fats and oils. The reaction results in producing alkylolimides and, in some cases, monoglycerides or diglycerides or both. These reaction products are sulphonated and constitute extraordinarily effective wetting and washing agents.

In practicing my invention, I cause a natural glyceride to react with a monoalkylolamine in the proportion of one molecule of glyceride to ½ to 1½ molecules of monoalkylolamine, at temperatures above 200° C., preferably 230 to 235° C., and in the course of the reaction the triglyceride splits causing the formation of an alkylolimide as well as monoglyceride or diglyceride, or both. The reactions which occur are explained by the following equations:

1. By using equimolecular quantities of oil or fat (natural triglyceride) and monoethanolamine the reaction proceeds according to the following equations:

$$(a)\ \begin{matrix} R.COO.CH_2 \\ R.COO.CH \\ R.COO.CH_2 \end{matrix} + NH_2.C_2H_4.OH =$$

$$\begin{matrix} CH_2.OH \\ R.COO.CH + R.CO.N.C_2H_4.OH \\ R.COO.CH_2 \quad\quad H \end{matrix}$$

$$(b)\ \begin{matrix} CH_2.OH \\ R.COO.CH + R.CO.N.C_2H_4.OH = \\ R.COO.CH_2 \quad\quad H \end{matrix}$$

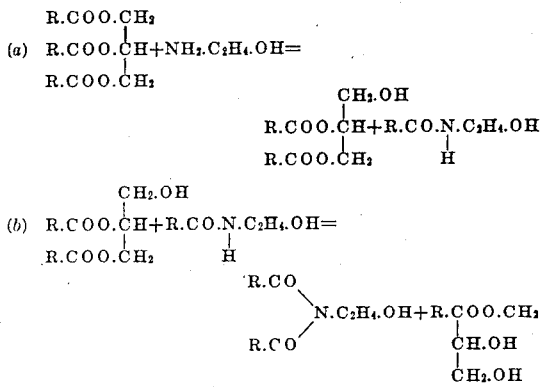

The reaction according to Equation $b$ is completed after the mixture has been subjected to a temperature of 235° C., for one hour and one-half.

2. If, instead of using equimolecular quantities of the reagents, only one molecule of monoethanolamine for every two molecules of natural triglyceride be used, the reaction succeeding reaction $a$, as depicted above, would be according to the following equation:

$$(c)\ R.CO.N.C_2H_4.OH + \begin{matrix} R.COO.CH_2 \\ R.COO.CH \\ R.COO.CH_2 \end{matrix} =$$
$$\quad H$$

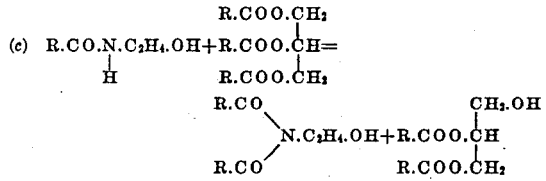

3. By using three molecules of monoethanolamine for every two molecules of fat or oil (natural triglyceride) the reaction would proceed according to the following equation:

$$(d)\ 2R.COO.\underset{R.COO.CH_2}{\overset{R.COO.CH_2}{CH}} + 3NH_2.C_2H_4.OH =$$

$$3R.CO.N.C_2H_4.OH + \begin{matrix} CH_2OH \\ R.COO.CH \\ R.COO.CH_2 \end{matrix} + \begin{matrix} OH \\ CH_2 \\ CHOH \\ R.COO.CH_2 \end{matrix}$$
$$\quad H$$

$$(e)\ R.CO.N.C_2H_4.OH + \begin{matrix} CH_2OH \\ R.COO.CH \\ R.COO.CH_2 \end{matrix} =$$
$$\quad H$$

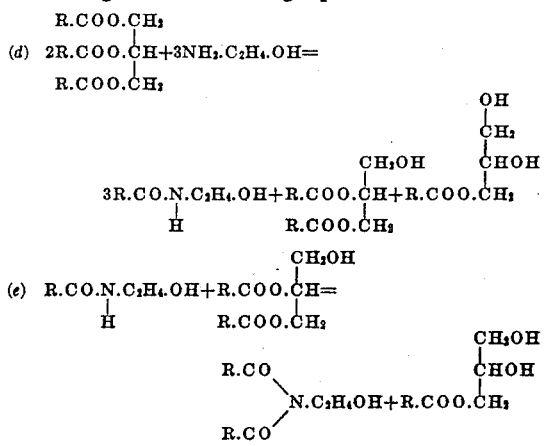

This reaction is complete when the mixture has been held at a temperature of from 230 to 235° C. for one hour and one-half.

By further heating the reaction products of Equation 2 to 245 to 250° C., the glycerine, being wholly insoluble in the resulting fatty acid ethanolimide, will separate out and settle in the bottom of the reaction vessel as a thick yellow oil. The reaction which occurs during this additional heating step and which follows the reaction expressed in Equation $d$ is explained by the following equation:

$$(f)\ 3R.CO.N.C_2H_4.OH + \begin{matrix} CH_2OH \\ R.COO.CH \\ R.COO.CH_2 \end{matrix} + \begin{matrix} CH_2OH \\ CHOH \\ CH_2 \end{matrix} =$$
$$\quad H$$

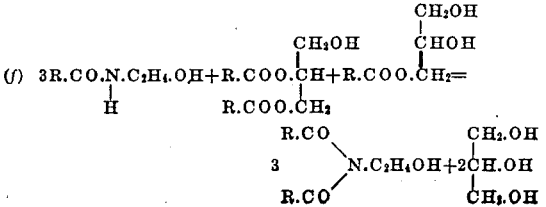

The resulting products of any of reactions 1 to 3 are sulphonated by being treated with a suitable sulphonating agent, preferably sulphuric acid of about 96% concentration, although monohydrate, fuming sulphuric acid or chlorsulphonic acid may be used equally well. The character of sulphonating agent employed is preferably determined by the character of the fatty acid radical present in the final product. If, for example, the radical is of a strongly unsaturated kind, as is the case when oils are the starting materials, relatively mild sulfonating agents are used, while strong sulphonating agents may be used for saturated fatty acid radicals. After sulphonation, the products are neutralized to form a paste which may be readily converted into powder by drying.

These neutralized sulphonation products are readily soluble in water, have pronounced wetting and washing properties, are completely resistant to lime, foam profusely and display strong resistance to alkalies and acids. The products are adapted for use as detergents in the textile and leather industries, as washing agents in household use, as cleaning agents for oily and fatty substances and as shampoos.

Among the triglycerides which I may use as starting materials in carrying out my invention are all neutral animal and vegetable fats or oils as well as the hydrogenation products of the latter, such as cocoanut oil, palm seed oil, olive oil, soya bean oil, fish oil, train oil, tallow, castor oil, etc., as well as the hardened oils. Suitable monoalkylolamines for the purpose of my invention are monoethanolamine, monopropanolamine and their higher chains, although monoethanolamine is generally the preferred reagent because of its cheapness.

The preferred procedure in effecting the reactions contemplated by my invention consists in introducing the desired quantity of fat or oil into a vessel provided with agitating means, heating the contents of the vessel to about 180° C., then introducing the proper quantity of monoalkylolamine, while agitating constantly, continuing agitation while the reagents are heated to 235° C., holding the mass at this temperature and continuing agitation for one to two hours, and finally cooling the product. The products of this reaction are soft, waxy masses the melting point of which varies between 22° C. and 48° C., dependent upon the character of triglyceride used initially; if castor oil was the starting material the melting point of the reaction product is 22° C., and if hardened train oil was used the melting point of the reaction product is 48° C.

Sulfonation of these reaction products is effected by introducing lumps or pieces of the product into appropriate quantities of sulphuric acid or other sulphonating agent, agitating the solution, maintaining the temperature initially at about 30° C., and then raising it to 45 to 50° C. The sulphonating agent is used in excess which may later be removed by washing with Glauber's salt solution. The sulphonation product is neutralized in a manner well known in the art with a caustic soda solution of 30 to 40% concentration, although potassium solution, liquid ammonia or any amine may be employed as a neutralizing agent.

*Example 1*

100 ounces of cocoanut fat having an acid number of 0.4 and a saponification number of 255 are heated to 190° C., in a vessel provided with agitating mechanism; 10 ounces of monoethanolamine are stirred in, the temperature immediately raised to 235° C., and maintained at this value for one hour and one-half, whereupon the mass is cooled. The reaction product is a white, waxy mass, of the odor of nuts, having a melting point of 36° C.

To sulphonate this reaction product, 40 ounces thereof are introduced in pieces of approximately nut size into a liter (1,000 ccm.) of sulphuric acid of 96% concentration, vigorous stirring being effected during the operation. The temperature is maintained at approximately 35° C., while about the first 20 ounces of reaction product are being introduced, and by a more rapid introduction of the balance of the reaction product the temperature is raised to about 45° C. As soon as the reaction product has been dissolved in the acid, agitation is discontinued and the mass is permitted to cool down to about 25° C. The sulphonation product is a very thick, brown oil.

To wash out the excess of sulphonating agent from the sulphonation product, the latter is stirred slowly into 1½ liters of a Glauber's salt solution saturated at 20° C., the temperature rising slowly and remaining stationary at about 40° C. When the sulfonate and Glauber's salt solution have been thoroughly stirred together, the mass is permitted to stand for two to three hours at about 40° C., resulting in practically complete separation of the Glauber's salt solution with the excess of sulphonating agent. The Glauber's salt solution is drawn off and the acid sulphonate is directly neutralized, in the presence of stirring and cooling, with a 30% caustic soda solution. The final product is a thick, white paste which may be dried to a white powder.

If, in the course of stirring together the acid sulphonate and the Glauber's salt solution, a thick emulsion should form and the temperature drop below 40° C., the separation would be very slow but this condition can be changed and separation caused to take place immediately without rise in temperature by stirring 100 to 150 ccm. of technical ethyl alcohol into the mixture.

*Example 2*

100 ounces of castor oil are treated with 8 ounces of monoethanolamine exactly in the manner described in Example 1 (one molecule of oil to about one molecule of ethanolamine) resulting in the formation of a somewhat slimy white reaction product, having a melting point of 26° C.

40 to 45 ounces of the reaction product are introduced into 1,000 ccm. of sulphuric acid of 96% concentration and sulphonation and neutralization are effected as in Example 1. The neutralized sulphonate is a thick, oily mass which foams profusely and is clearly soluble in cold water.

This product is intended mainly as a shampoo, and to render it completely suitable for that purpose it is first freed of the excess of Glauber's salt by adding thereto 10% of technical ethyl alcohol, stirring the mixture thoroughly and then cooling it down to 6 to 8° C. to crystallize out the Glauber's salt. As soon as this temperature is reached, the oil is centrifuged off and then adjusted to 20% content by means of a 10% alcohol. The final product is a light yellow, viscous oil having high foaming properties and good cleaning properties.

*Example 3*

100 ounces of castor oil are reacted with 4½ ounces of monoethanolamine (about ½ molecule of monoethanolamine to 1 molecule of oil) as described in Example 1. The reaction product is an oily mass which solidifies at about 18° C., and then has a melting point of about 22° C. The reaction product is sulphonated and further treated as described in Example 2. The neutralized product is an oil having excellent washing and emulsifying properties.

*Example 4*

100 ounces of cocoanut oil are treated with 15 ounces of monoethanolamine in the manner described in Example 1, i. e., about 1½ molecules of monoethanolamine are used per molecule of oil. The resulting reaction product is of a somewhat harder structure than that of Example 1 and has a melting point of 41° C.

The product, which is a mixture of amides, imides, monoglycerides and diglycerides, is sulfonated and neutralized in the manner described in Example 1, resulting in the recovery of a paste having excellent washing and foaming properties but whose wetting action is not equal to that of the product of Example 1.

*Example 5*

100 ounces of cocoanut oil and 15 ounces of monoethanolamine are heated to 250° C., (instead of 235° C., as in Example 4) and maintained at this temperature for two hours. The oil becomes turgid, and after cooling a fairly substantial quantity of glycerine separates out as a viscid yellow mass and settles on the bottom of the reaction vessel. The reaction product has melting point of 32° C., and consists almost entirely of ethanolimide of fatty acids. When this product is sulfonated, after removal of the glycerine, a paste is obtained which has excellent emulsifying and cleaning characteristics but whose wetting property does not equal that of the product of Example 1.

*Example 6*

100 ounces of hydrogenated train oil having a melting point of 42° C., and a saponification number of 186 are heated in an agitating vessel with 8 ounces of monoethanolamine to 235° C., producing a hard, slightly yellowish product having a melting point of 48° C.

This product is sulfonated in the manner described in Example 1, yielding a thick, white paste, soluble in lukewarm water, having excellent washing and emulsifying properties but less good wetting and foaming capabilities.

I claim:

1. The herein described method of producing detergents and like products, which method comprises the steps of reacting at temperature between about 200° C. and about 235° C. from ½ molecule to 1½ molecules of monoalkylolamine with 1 molecule of natural triglyceride of higher molecular fatty acids until a mixture is formed which is practically free from ester amides and consists of fatty acid amides, fatty acid imides, monoglycerides of the fatty acids and diglycerides of the fatty acids, and then sulfonating said mixture.

2. The method claimed in claim 1, comprising the further step of neutralizing the sulfonated mixture.

3. As a new product, a sulfonated mixture consisting of amides, imides, monoglycerides and diglycerides of higher molecular fatty acids and being free from ester amides, said mixture being obtained by the reaction of from ½ molecule to 1½ molecules of monoalkylolamine with 1 molecule of natural triglyceride of the fatty acids at temperatures between about 200° C. and about 235° C.

4. As a new product, the neutralized sulfonation product of a mixture consisting of amides, imides, monoglycerides and diglycerides of higher molecular fatty acids and being free from ester amides, said mixture being obtained by the reaction of from ½ molecule to 1½ molecules of monoalkylolamine with 1 molecule of natural triglyceride of the fatty acid at temperatures between about 200° C. and about 235° C.

ERNST ALFRED MAUERSBERGER.